United States Patent [19]

Dennison et al.

[11] 4,339,770
[45] Jul. 13, 1982

[54] SYNCHRONIZING SYSTEM WITH CHROMA PARITY DETECTION

[75] Inventors: Robert C. Dennison, Westmont; James M. Walter, Columbus, both of N.J.

[73] Assignee: RCA Corporation, New York, N.Y.

[21] Appl. No.: 200,905

[22] Filed: Oct. 27, 1980

Related U.S. Application Data

[63] Continuation of Ser. No. 94,281, Nov. 19, 1979, abandoned.

[51] Int. Cl.³ .............................................. H04N 9/46
[52] U.S. Cl. ......................................... 358/19; 358/8
[58] Field of Search ............................. 358/4, 8, 17, 19

[56] References Cited

U.S. PATENT DOCUMENTS

| | | | |
|---|---|---|---|
| 4,021,852 | 5/1977 | Hurst et al. | 360/38 |
| 4,024,571 | 5/1977 | Dischert et al. | 358/4 |
| 4,101,926 | 7/1978 | Dischert et al. | 358/17 |
| 4,110,785 | 8/1978 | Dischert et al. | 358/19 |

Primary Examiner—Robert L. Richardson
Attorney, Agent, or Firm—Eugene M. Whitacre; Paul J. Rasmussen; William H. Meise

[57] ABSTRACT

In a television time-base corrector or synchronizer using a coherent memory, the input signal is written into predetermined memory addresses in order of their arrival after sampling begins for each horizontal line. The sampling occurs at a rate established by the chroma subcarrier. Sampling begins at a zero crossing of the subcarrier following a fixed interval after the horizontal synchronizing signal. Since the burst does not occur at a predetermined time after the horizontal synchronizing signal, the phase of the burst at a fixed interval after the horizontal synchronizing signal may vary when the source of the television signal changes, and this may result in horizontal displacement of the video on playback. In order to reduce the magnitude of the displacement, the zero-crossing detector operates on either positive or negative-going zero crossings. A phase ambiguity is thereby introduced which may result in color reversal. The ambiguity is resolved with a phase sensor coupled to the zero-crossing detector and a chroma inverter responsive to the phase sensor for inverting the delayed chroma relative to the reference subcarrier.

21 Claims, 7 Drawing Figures

SYNCHRONIZING SYSTEM WITH CHROMA PARITY DETECTION

This is a continuation of application Ser. No. 094,281, filed Nov. 19, 1979 and now abandoned.

BACKGROUND OF THE INVENTION

This invention relates to television time-base correctors and synchronizers in which an analog television video signal is digitized at a rate determined by the input signal subcarrier to form digital words which are written into a memory and which are read out of the memory in synchronism with a local reference subcarrier.

In the recording of video signals by video tape recorders, video discs and the like, the video information is encoded and recorded on a moving mechanical medium such as tape or discs. Unavoidable fluctuations in the mechanical speed of the medium during both recording and playback cause changes in the data rate of the video on playback compared with that rate at which it was recorded. The use of servo-mechanisms to control the speed of the medium can maintain a correct average data rate on playback, but short-term fluctuations in the mechanical speed of the medium cause short-term fluctuations or jitter in the video signal on playback. Such jitter may be tolerable for some applications, but electronic time-base correctors are used to correct the jitter for critical applications.

Such time-base correctors include a digital memory capable of storing the information contained in several horizontal lines (one or more vertical fields in the case of synchronizers) of video information. An analog-to-digital converter (ADC) converts the incoming video to a stream of digital words which are written into the memory for storage. At a later time, the digital words are read out of the memory at a constant clock rate established by a local reference source, thereby eliminating the jitter.

The chrominance information contained in the television video signal is encoded as phase and amplitude modulation of a signal relative to a color reference subcarrier. Since there is no reference subcarrier which is common to both the input and output sides of the memory, the chrominance information is maintained by making the write-in and read-out clock rates the same multiple (such as 3 or 4 times) of the input video and local output reference subcarrier frequencies, respectively.

A saving of memory capacity may be achieved by storing only the active video information and not storing the repetitive synchronizing information, as described in U.S. Pat. No. 4,101,926 issued July 18, 1978 to Dischert, et al. In this arrangement, maintenance of the color information between input and output of the memory is accomplished by beginning the clocking for write-in and read-out of each horizontal line in a coherent manner, at a fixed preassigned phase of the relevant subcarrier signal.

In such coherent memory arrangements, a subcarrier signal is phase-locked line by line to the color burst signal of the incoming video. This signal is a reconstruction of the original subcarrier that existed when the video and burst were generated and is referred to hereinafter as a WRITE subcarrier. Digitizing and writing into the memory for each successive horizontal line begins at the first occurrence of a particular phase of the WRITE subcarrier occurring after a fixed interval after the horizontal synchronizing signal. For example, clocking for each horizontal line might begin at the first positive-going zero crossing of the reference subcarrier occurring after a time 8 microseconds after each horizontal synchronizing pulse of the incoming signal. Similarly, clocking for read-out from the memory in this case would begin at the first positive-going zero crossing of the local reference subcarrier which occurs after a time 8 microseconds after the local reference horizontal synchronizing signal. This color phase information is not lost in translation through the memory.

Television standards do not closely specify the timing of the color burst with regard to the horizontal synchronizing signal. Consequently, video from two different sources may have differences in the phase of the color burst signal relative to the horizontal synchronizing signal even though the burst frequencies of the two sources are identical and the synchronizing signals are coincident. In a coherent system such as that of Dischert, et al., a change from one source of video to another can result in a change in the phase that the input WRITE subcarrier takes at a fixed time after the horizontal synchronizing signal. The next following occurrence of a positive-going zero crossing of the WRITE subcarrier may thus cause a change in the time of commencement of gating for writing into the memory compared with the time of commencement of the previous line. The maximum time change is equal to the duration of one cycle of color subcarrier or 280 nanoseconds. The read-out, however, continues unchanged. The change in delay between the horizontal synchronizing pulse and the beginning of writing-in to the memory thus results in a horizontal displacement of the video as displayed on a raster. A change of 280 nanoseconds is highly visible. While a single such change during switching between two sources might not be objectionable, in stop-motion applications in which less than 4 NTSC fields are stored and successively displayed, horizontal displacement of the video of one field will occur relative to the video of the preceeding and succeeding fields. Thus, continuous horizontal displacement at the field rate occurs, which is highly objectionable. If an attempt is made to reduce the step size, chroma errors occur between successive fields in such stop-motion systems.

SUMMARY OF THE INVENTION

A television video delay arrangement is adapted for delaying color TV signals from a source of composite signals including sync signals, chroma information and burst. An input clock generator coupled to the source of TV signals generates input clock signals at a rate related to the frequency of the burst signals. A memory is coupled to the input clock generator by a gate for gating input clock signals to the memory at the time of the first of a predetermined number of phases of the burst following a predetermined time including zero time after each sync signal for beginning writing of the video into memory. This creates an ambiguity in the phase of the burst relative to the chrominance information which may cause color distortion. A burst phase sensor is coupled to the source and to the gate for producing a phase indication signal indicative of the particular one of the predetermined number of phases of the burst at the time of commencement of writing into memory. Reading circuitry is included which is coupled to the memory for reading the chrominance information from the memory. The reading circuitry includes a phase corrector coupled to the phase sensor for correcting, under the control of the phase indication signal, the phase of the chrominance information coupled from memory relative to a local subcarrier to match the phase relationship existing in the chrominance information written into memory relative to burst for correcting color distortion.

DESCRIPTION OF THE INVENTION

Figure 1:
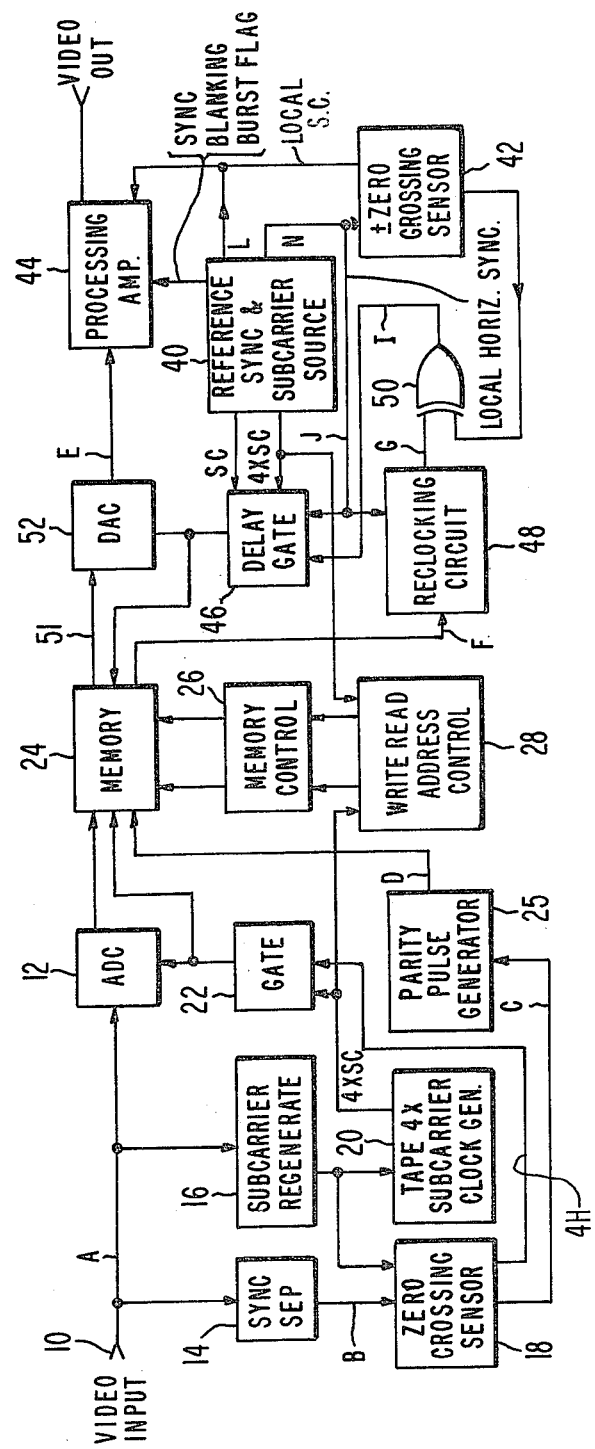
FIG. 1 is a block diagram of a time-base corrector or synchronizing system embodying the invention.
Figure 4:
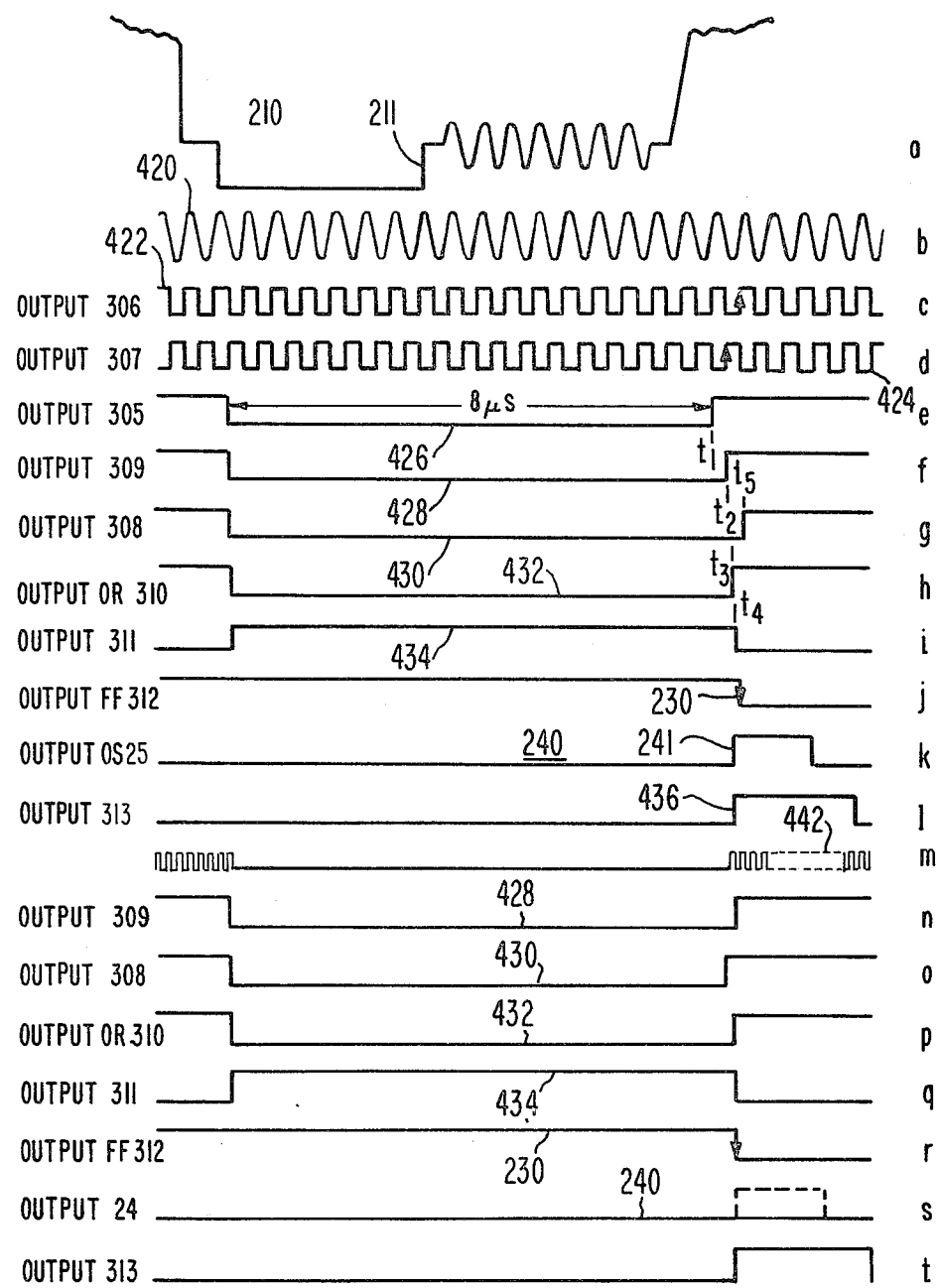
FIGS. 4 and 6 are voltage-time plots of waveforms occurring in the arrangements of FIGS. 3 and 5, respectively.

An analog composite color television signal such as 210 illustrated in FIG. 2a is applied to an input terminal 10 at upper left of FIG. 1 and is coupled over a conductor A to an analog-to-digital converter (ADC) 12, to a synchronization signal (sync) separator 14 and to an input signal subcarrier regenerator 16. Sync separator 14 operates on the composite video to extract horizontal synchronizing information therefrom, and couples horizontal synchronizing pulses illustrated as waveforms 220 of FIG. 2b over a conductor B to a zero-crossing sensor 18. A regenerated subcarrier illustrated as 420 of FIG. 4b in synchronism with the color burst portion of the input composite video is generated by subcarrier regenerator 16, and is coupled to zero-crossing sensor 18 and to a subcarrier clock generator 20. Clock generator 20 produces clock pulses at a multiple (illustratively four times) of the regenerated subcarrier frequency. The clock signals illustrated as 442 of FIG. 4m are coupled through a gating circuit 22 to ADC 12 and to memory 24 for controlling the digitizing of video signal 210 and its writing into memory. Zero-crossing sensor 18 senses the first zero crossing of input subcarrier 420 which occurs after a fixed time after a horizontal sync pulse 220 and producers at the time of that zero crossing an enabling signal illustrated as 432 of FIG. 4h, which enabling signal is coupled over a conductor 4H to gate 22 to allow clocking of ADC 12 and memory 24 to begin at an appropriate point on the input video signal and at a zero crossing of the regenerated subcarrier.

Zero-crossing sensor 18 also identifies the polarity of the zero crossing and produces an identification signal illustrated as 230 of FIG. 2c which is coupled by a conductor C to a parity pulse generator 25. Identification signal 230 changes state each time the zero crossing of the input subcarrier is of the opposite polarity to that of the previous horizontal line. Each transition of signal 230 occurs at a time delayed by a fixed interval from the preceding horizontal synchronizing time. In normal operation with video applied from a single source, odd-even identification signal 230 alternates states during alternate lines because of the 180° line-to-line phase alternation specified by NTSC standards. Parity pulse generator 25 responds to negative-going transitions of odd-even identification pulse 230 with a parity pulse 240. Parity pulse 240 is coupled by a conductor D to memory 24. The parity pulse is an additional bit which is written into memory at the time of its appearance together with the video existing at that time.

A memory control 26 is associated with each digital memory 24 for addressing particular memory locations under the influence of a write-read address control 28 which is coupled to write (input) and read (output) clock generators, as known. In order to minimize the storage capacity necessary for memory 24, the synchronizing and blanking interval information of the television signal is not stored since the information is redundant and can be reinserted after storage. The time delay of the video in memory 24 is established by the difference between the input and output data rates, which chiefly depends upon the jitter of the video source. Video in the form of a stream of digital words (commonly 8 to 10 bits wide) is coupled out of memory 24 on conductor 51 after an appropriate delay, and is coupled to a digital-to-analog converter (DAC) 52. The parity pulse is clocked out of memory 24 on a conductor F at a time advanced from that of the video with which it is associated by the duration of one horizontal line, in order to allow for the one line delay introduced in a later reclocking operation that produces the final chroma invert signal. With memory systems having a storage capacity of more than four lines it may be too expensive to provide the advanced parity bit. If the parity bit is read out at the same time as the line of video it is associated with, the result will be one line of inverted color whenever the clock inverter operates. In practice, the result is rarely noticeable.

A reference synchronizing signal and subcarrier source 40 includes a source 56 (not shown) which produces local subcarrier reference signals which are applied to a zero-crossing sensor 42 and to a processing amplifier 44. Source 40 also includes a local clock generator 58 (not shown) which produces a clock at a multiple of the local subcarrier rate, which is applied to a delay gate 46 and to address control 28. Source 40 further includes a local sync signal source 54 which produces burst flag, blanking and sync signals which are applied to processing amplifier 44 and horizontal sync signals which are applied to sensor 42, gate 46 and to a reclocking circuit 48. Reclocking circuit 48 receives delayed parity pulses illustrated as 250 in FIG. 2f over a conductor F for reclocking. As shown in FIG. 2f, the parity pulses illustrated generally as 250 are delayed, illustratively by a time equal to 2.6 horizontal lines from the corresponding undelayed parity pulses 240, but it should be understood that the amount of delay may vary widely depending upon the input timing error. Reclocking circuit 48 produces at its output a reclocked odd-even identification signal illustrated as 270 in FIG. 2g, which is coupled over a conductor G to an input of an EXCLUSIVE-OR gate 50. Zero-crossing sensor 42 produces a regularly alternating local odd-even signal illustrated as 277 in FIG. 2h, which is coupled over a conductor H to the other input of gate 50. Gate 50 compares the reclocked odd-even signal with the local odd-even signal to produce a raw invert signal illustrated as 280 in FIG. 2i. The raw invert signal is coupled by a conductor I to delay gate 46 where it is reclocked to remove the narrow pulses. This reclocking is timed by the local sync signal 290 illustrated in FIG. 2j and this operation introduces a one line delay. The final invert signal shown as 297 in FIG. 2k is used to control the delay and therefore the phase of the clock signal.

The selectively delayed read clock signal at the output of delay gate 46 is coupled to memory 24 and DAC 52.

In operation, composite video illustrated as 210 in FIG. 2a is applied to input terminal 10. As illustrated, composite video 210 includes the last four horizontal lines 211–214 of video from a first source and the first five lines 215–219 of video from a second source in which the burst occurs at a slightly different phase from the horizontal synchronizing signal as compared with the first source. As mentioned, zero crossing sensor 18 responds to phase alternations of the video on line A to switch odd-even identification signal 230. As illustrated in FIG. 2c, odd-even identification signal 230 alternates at times T5, T11, T17 and T29 in response to the alternations of the phase of the burst of horizontal lines 211–214 relative to the previous line. For illustrative purposes, the phase of the burst of line 215 relative to the synchronizing signal in the interval T37–T39 is assumed to be sufficiently different from that of preceding line 214 so that phase inversion from the preceding line does not take place, as explained more fully hereinafter. As a result of the lack of phase inversion, odd-even identification signal 230 produced by sensor 18 does not alternate at time T41. Thereafter, alternations take place on a regular basis as illustrated at times T53, T65, and T77, thus indicating consistent line-to-line phase of the burst relative to the horizontal synchronizing signal. Parity pulse generator 25 responds to negative-going excursions of odd-even identification signal 230 to produce pulses 241–244. The positive-going excursions of signal 230 produce no pulses, as illustrated at times T11, T29, and T65. In the absence of a transition of signal 230, no parity pulse is produced, as for example at time T41. Parity pulse train 240 is clocked into memory in association with the video line which it identifies in a manner described hereinafter.

On the output side of memory 24, parity pulse 241 is read out at a time T23 as pulse 251. The video of the line with which pulse 251 is associated is read out one horizontal line later, at a time starting near T35 as illustrated by waveform 260 of FIG. 2e. Reclocking circuit 48 reconstitutes odd-even identification signal 230 to form signal 270 of FIG. 2g. Zero-crossing sensor 42 produces an odd-even identification signal related to the local reference subcarrier signal. The reconstituted and local odd-even identification signals 270 and 277 are compared by gate 50 to produce an output of a first polarity when signals 270 and 277 are inverted with respect to each other, as illustrated by waveform 280 of FIG. 2i in the interval preceding time T71, and to produce an output of the opposite polarity when signals 270 and 277 are in-phase, as in the interval following time T71. Differences between the delays of the channels driving the inputs of gate 50 create slight phase differences between waveform 270 and 277, which result in short-duration pulses in signal 280 as at times T23, T35, etc. As will be described, these pulses have no effect on the operation of the system. Delay gate 46 receives local horizontal sync signals illustrated as 290 as well as signal 280. Delay gate 46 is capable of delaying the read clock applied to memory 24 and DAC 52 by one-half subcarrier cycle (180°). The selection of the delayed or undelayed condition is determined by the condition of output signal 280 of gate 50 near the time of the local horizontal sync pulse, and this condition is held or latched until the end of the horizontal line, at which time the occurrence of the next following local horizontal sync pulse again causes gate 46 to sense the condition of signal 280.

Figure 2:
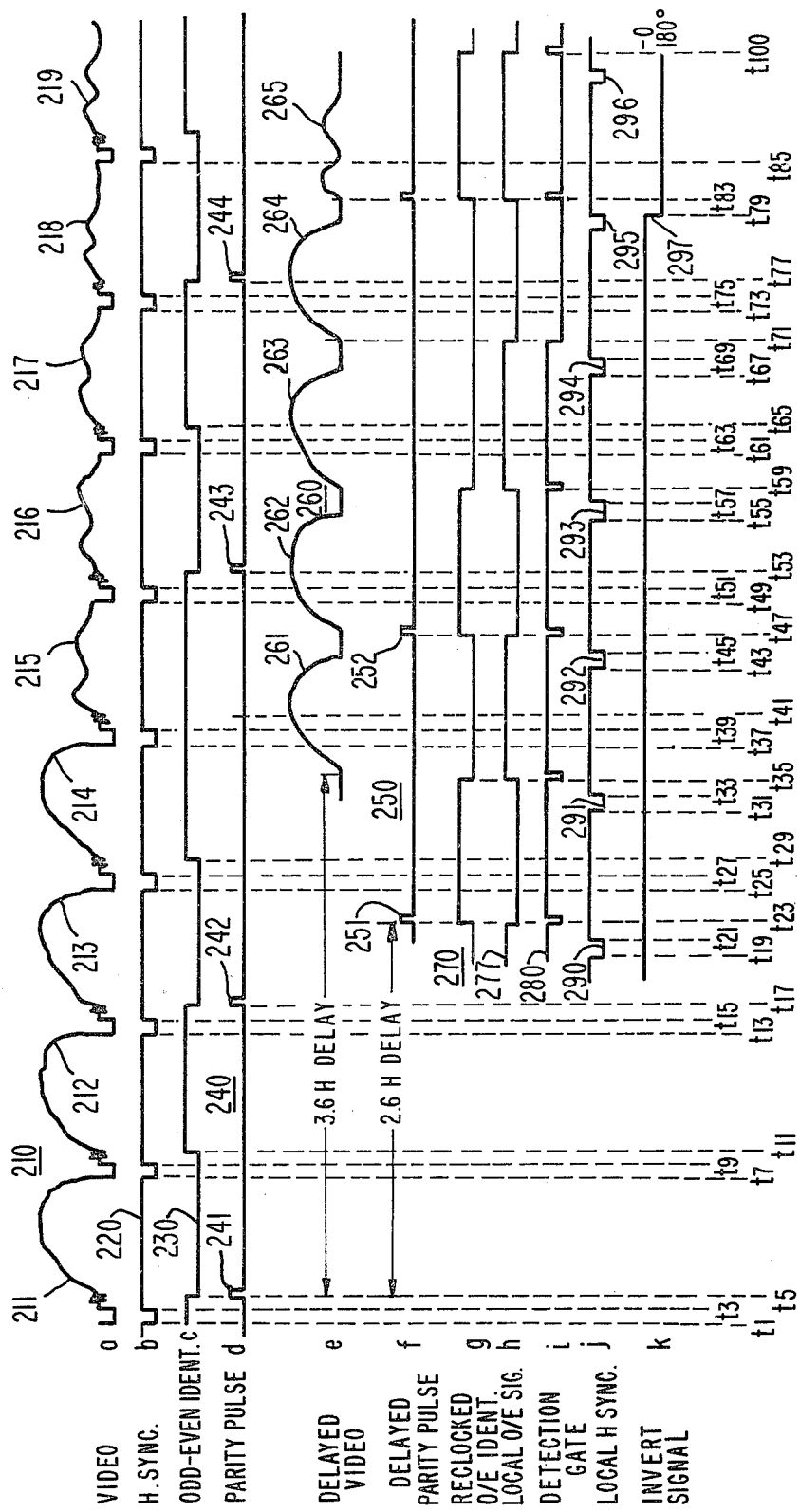
FIG. 2 illustrates voltage-time plots of waveforms useful in understanding the operation of the arrangement of FIG. 1.

Thus, in FIG. 2, a HIGH condition of signal 280 at time T69 is held or latched as a HIGH in signal 297 and a LOW condition of signal 280 at time T79 is latched as a LOW condition in signal 297. Thus, in FIG. 2k, a HIGH condition of waveform 297 represents for example an undelayed condition of delay gate 46 and a LOW therefore represents a 180° delay. As illustrated in FIG. 2, switching between the delayed and undelayed condition of the delay gate occurs at a time T79, substantially coincident with the trailing edge of a local timing control horizontal synchronizing pulse 295. Time T79 occurs at a time after the last portion 264 of the delayed video has been read out of memory and before the beginning of the reading out of memory of video portion 265. Thus, switching of the phase of the clock signal applied to the memory and to the DAC occurs at that moment representing the time at which video from the first source has been read out but before video from the second source begins to be read out of memory. The chroma error which would have occurred because of the effective 180° shift in phase of the subcarrier at write-in is compensated by a corresponding shift in phase in the read clock at read-out.

Figure 3:
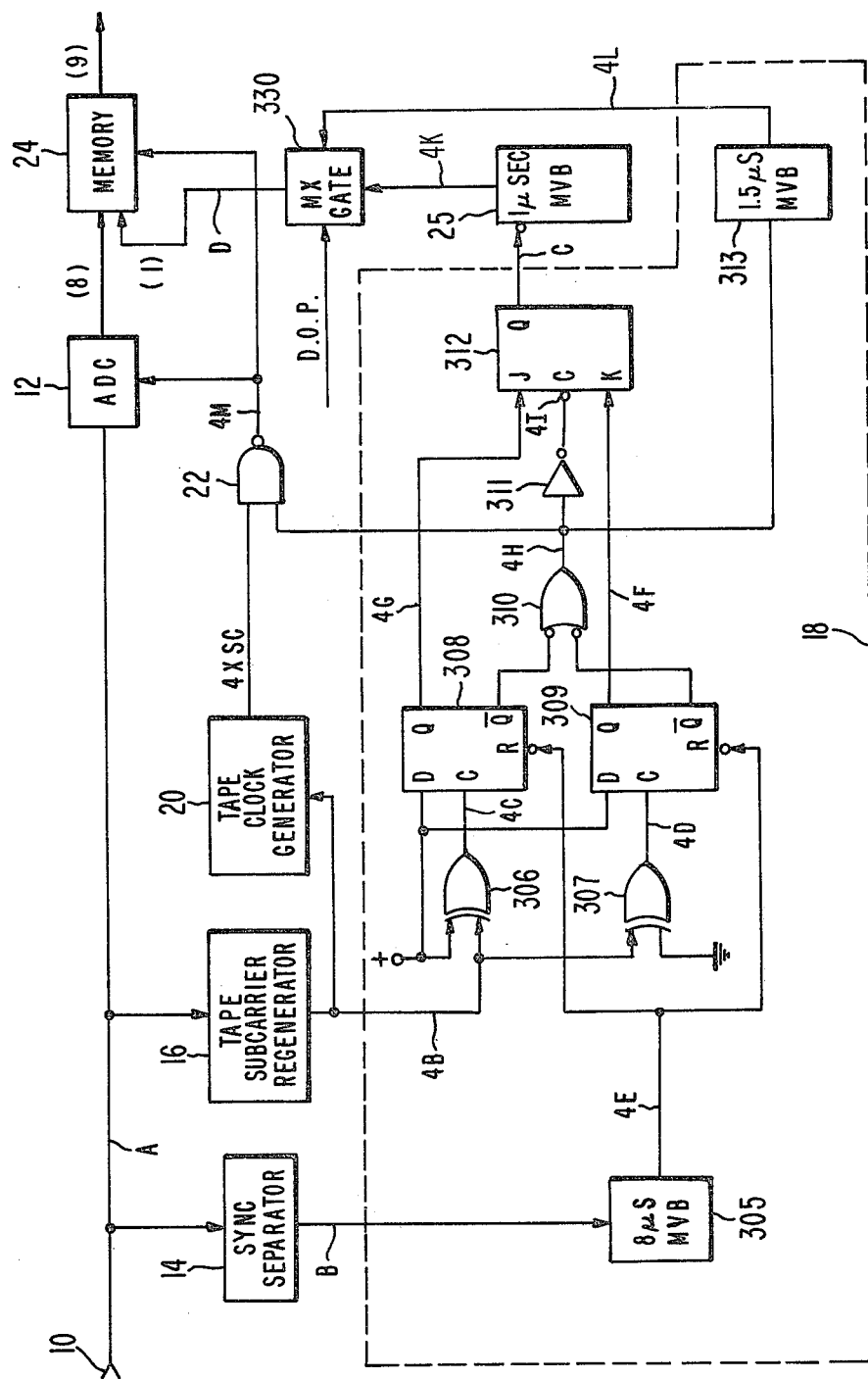
FIGS. 3 and 5 are more detailed block diagrams of portions of the arrangement of FIG. 1.

FIG. 3 is a more detailed block diagram of the write-in portion of the arrangement of FIG. 1. Those elements of FIG. 3 corresponding to elements of FIG. 1 are designated by the same number. FIG. 3 differs from the pertinent portion of FIG. 1 by the inclusion of a multiplexing gate 330 and by the inclusion of further details relating to zero-crossing sensor 18, gates 22 and 25. Regenerated subcarrier illustrated as 420 in FIG. 4b is coupled by a conductor 4B to one input of each of EXCLUSIVE-OR gates 306 and 307. The other inputs of gates 306 and 307 are coupled to B+ and ground, respectively. Gates 306 and 307 produce mutually antiphase square waves illustrated as 422 and 424 of FIGS. 4c and 4d, respectively, on conductors 4C and 4D for application to the clock inputs of D-type flip-flops (FF) 308 and 309, respectively. The D inputs of FF 308 and 309 are coupled to B+. A one-shot (OS) multivibrator (MVB) 305 has its input coupled to conductor B to receive horizontal synchronizing information and produces a pulse having a duration illustratively of 8 microseconds as illustrated by waveform 426 of FIG. 4e. The delay introduced by MVB 305 is intended to delay the sampling of the phase of the regenerated subcarrier until a time at which the subcarrier phase most closely approximates the burst phase, which occurs at a time near the end of each burst signal. In principle, this delay is not necessary. Pulse 426 is coupled to the reset inputs of FF 308 and 309 by a conductor 4E. The occurrence of a horizontal sync pulse at a time T0 triggers MVB 305.

After time T1, FF 308 and 309 are active, and each responds to the next following positive-going transition of the signal applied to their respective clock inputs, by producing at their Q outputs the HIGH applied to their D inputs. The Q output of FF 309, illustrated as waveform 428 of FIG. 4f, has a positive-going transition at a time T2. Also, at time T2, the Q̄ output of FF 309 makes a HIGH-to-LOW transition. Similarly, at a later time T5, the Q output of FF 308 makes a LOW-to-HIGH transition as illustrated by 430 of FIG. 4g and the Q̄ output makes a corresponding transition to LOW. The Q̄ outputs of FF 308 and 309 are coupled to the J and K inputs of J-K FF 312. The Q outputs of FF 308 and 309 are each coupled to an input of a negative-logic OR gate 310. The output of OR gate 310 is illustrated as waveform 432 of FIG. 4h. It will be noted that the transition of waveform 432 occurs at a time T3 later than time T2 at which FF 308 switches because of propagation delays. The output of gate 310 is coupled by a conductor 4H to an inverting stage 311, which produces an inverted output illustrated as 434 of FIG. 4i which is coupled by a conductor 4I to the clock (C) input of FF 312. The HIGH-to-LOW transition of waveform 434 initiated by the transition of waveform 432 is further delayed to a time T4 by the propagation delay of the inverter. The clock input applied to FF 312 from FF 308 and 309 arrives later than the information input, thus avoiding a race condition.

The output of FF 312 on conductor C illustrated as signal 230 of FIG. 2c is repeated in FIG. 4j to make the time relationships clear. The negative-going transition at the Q output of FF 312 is coupled by conductor C to pulse generator 25, comprising a OS MVB 25, which responds with a pulse 241, which is also illustrated again in FIG. 4k. Pulse 241 illustratively has a duration of 1 $\mu$S. The leading edge of pulse 241 is substantially coincident with the transition of waveform 432 at the output of gate 310. Waveform 32 is also coupled by conductor 4H to gate 22 to begin the gating of subcarrier, as illustrated at time T3 by 442 of FIG. 4m. Signal 432 is also coupled by conductor 4H to a multivibrator 313, illustratively having a duration of 1.5 $\mu$S, the output of which is coupled over conductor 4M to multiplex gate 330. Gate 330 may be a simple gate allowing pulse 241 to be clocked into memory, or it may be as shown a multiplex gate by which a dropout pulse (DOP) may be coupled through the memory during the unblanked video portions of the horizontal line interval when the memory is used in conjunction with a dropout compensator. In either case, parity pulse 241 is coupled to the memory by a conductor D and is written into memory near the beginning of the video interval. Conductor D carries a single bit as indicated by the parenthetic numeral one adjacent the conductor. Storage of 8-bit digitized video together with the 1-bit parity pulse requires a memory capable of handling 9-bit words. Since most time-base correctors include a dropout corrector or compensator, the parity bit can time-share the dropout bit channel by use of multiplexing gate 350 of FIG. 3.

As described, the arrangement of FIG. 3 provides a fixed delay T0-T1 after the timing synchronization signal (the leading edge of the horizontal sync pulse), and provides a parity pulse 241 when the phase of the subcarrier is such that the next following positive-going transition is applied first to the clock input of FF 309 rather than to FF 308. FIGS. 4n-4t illustrate the waveforms of 4f-4l under the condition that the transition near time T1 of waveform 430 preceeds the transition of waveform 428. As illustrated by waveform 240 of FIG. 4s, no parity pulse is generated and the bit coupled to memory 24 is therefore a LOW.

Figure 5:
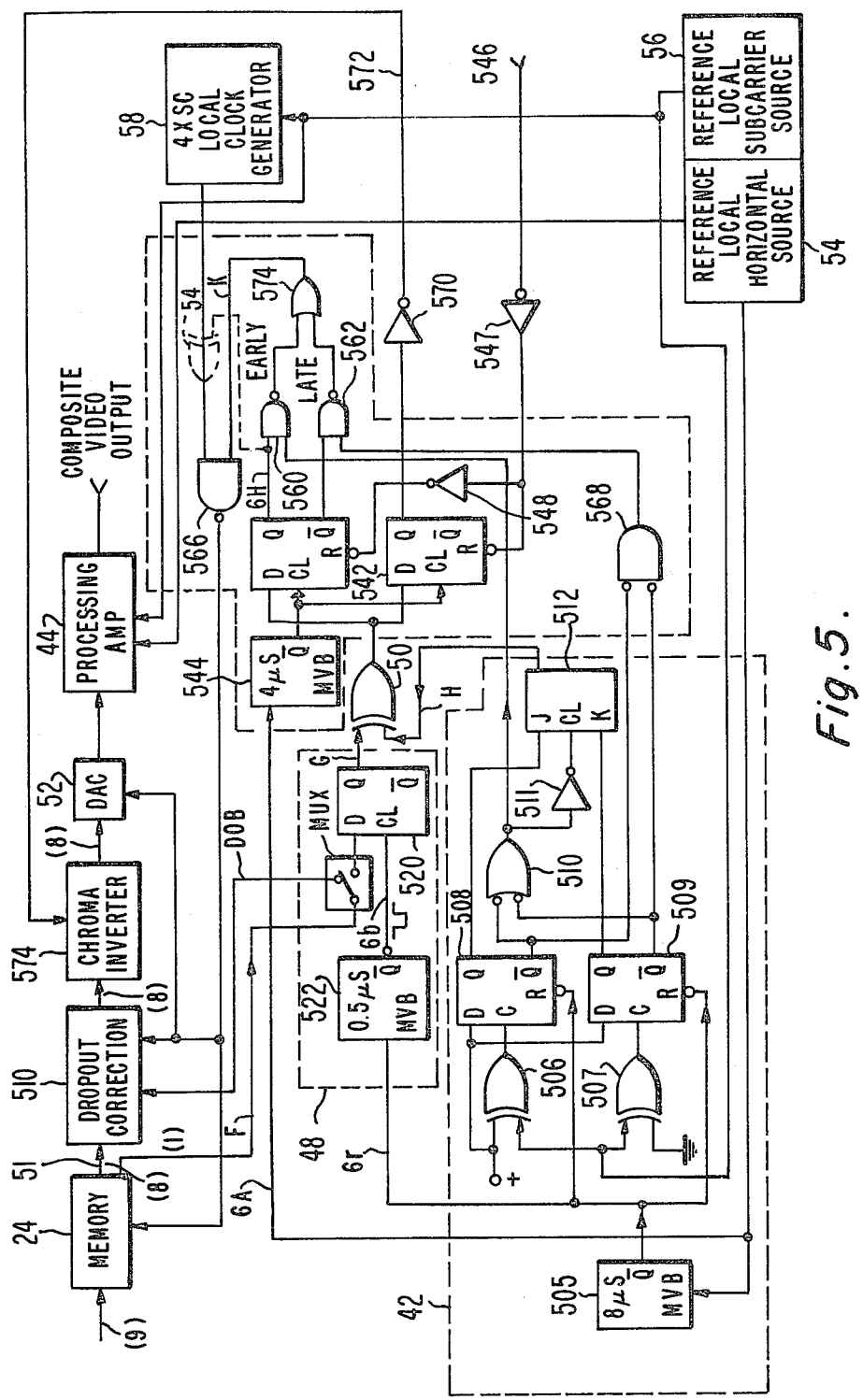

FIG. 5 is a more detailed block diagram of the output side of the arrangement illustrated in FIG. 1. Elements of FIG. 5 corresponding to those of FIG. 1 are provided with the same reference numbers. FIG. 5 differs from the relevant portion of FIG. 1 in that it includes details of zero-crossing detector 42, delay gate 46 and reclocking circuit 48. FIG. 5 also includes a chroma inverter 574 and a dropout corrector 510 located between memory 24 and DAC 52 to show the location of the dropout corrector which uses DOP as described in conjunction with FIG. 3.

Reclocking circuit 48 includes an OS MVB 522 having an input coupled to the output of MVB 505 of zero-crossing detector 42. The output of MVB 522 is a pulse illustratively having a duration of half a microsecond which is coupled to the clock input of a D-type FF 520. The delayed parity pulse clocked out of memory on conductor F is coupled to the D input of FF 520. The Q output of FF 520 is reclocked odd-even identification signal 270, which is coupled by conductor G to the input of gate 50. Delay gate 46 includes an OS MVB 544 the input of which is coupled to source 39 of local horizontal sync. The output of MVB 544 is coupled to the clock inputs of D-type FF 540 and 542. The D inputs of FF 540 and 542 are coupled to the output of gate 50. The Q output of FF 540 is coupled to an input of an early AND gate 560, and the $\bar{Q}$ output of FF 540 is coupled to an input of a late AND 562. A second input of early gate 560 is coupled to the output of OR gate 510 of zero-crossing detector 42. Another input of late gate 562 is coupled to the output of an AND gate 568, the inputs of which are coupled in parallel with the inputs of OR gate 510. The outputs of early gate 560 and late gate 562 are coupled to the inputs of an OR gate 564, the output of which is coupled to the input of an AND gate 566. The other input of gate 566 is the local clock signal from clock generator 41 at a multiple of the local subcarrier rate. The output of gate 566 is coupled to memory 24, DAC 52 and dropout corrector 510 for controlling the operations thereof.

It should be noted that clocking of memory 24 has already begun when a parity pulse is read out. If the parity pulse were to carry information relative to the subcarrier phase of the write clock of the video line in which the parity pulse occurred, a jump or change in the read clock phase might be required in the interval between the parity pulse and the remainder of the video on that line. Instead, the parity pulse is read from memory during a line preceding the one to which its information applies, and the signal is processed by comparison with the local subcarrier phase and the resulting information is stored. Reclocking circuit 48 accomplishes storage of the parity information for each line in FF 520, and its Q output is reclocked odd-even identification signal 270 of FIG. 2g.

In zero-crossing detector 42, gates 506, 507 and 510, FF 508, 509 and 512, inverter 511 and MVB 505 correspond exactly with elements of zero-crossing detector 18 illustrated in FIG. 3, the operation of which has been explained. A detailed explanation of the operation of these elements is therefore omitted.

Figure 6:
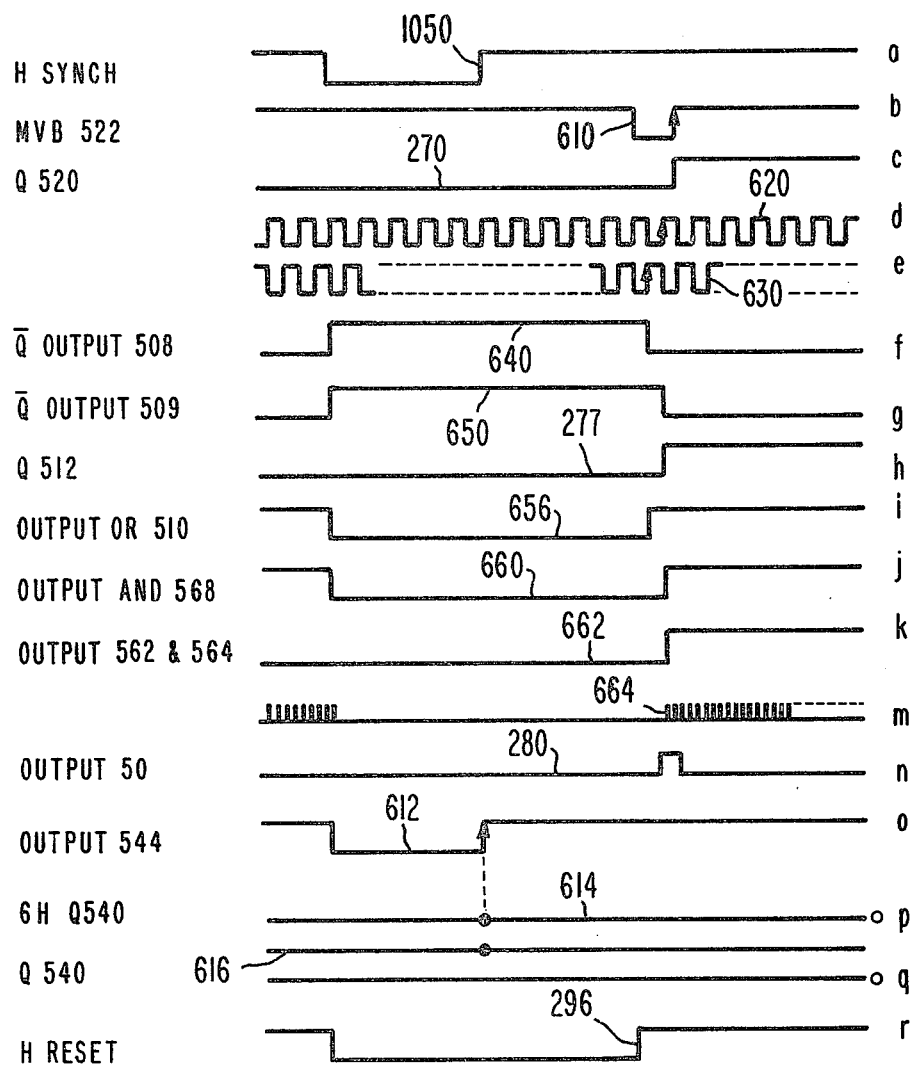

FIG. 6 illustrates waveforms allowing an understanding of the operation of the arrangement of FIG. 5. A local horizontal sync pulse such as pulse 1050 is illustrated in FIG. 6a. The $\bar{Q}$ output of OS MVB 505 is reset pulse 29 illustratively having a duration of 8 $\mu$S as shown in FIG. 6r.

A one-half $\mu$S pulse produced by MVB 522 is illustrated as 610 of FIG. 6b. FF 520 is triggered on the positive-going edge of pulse 610 to store a HIGH (or a LOW, when such is read from memory) parity pulse level at the Q output, as illustrated by 270 of FIG. 6c. Local reference subcarrier at the output of gates 506 and 507 is illustrated in FIGS. 6d and 6e, respectively, with the waveform having a disproportionately low frequency for enhanced understanding. The $\bar{Q}$ outputs of FF 508 and 509 are illustrated by waveforms 640 and 650, respectively, of FIGS. 6f and 6g. The local odd-even signal 277 produced by FF 512 is illustrated as 277 of FIG. 6h. The output of OR gate 510 in response to the Q̄ outputs of FF 508 and 509 is illustrated by waveform 656 of FIG. 6i, and the output of OR gate 568 is illustrated as 660 of FIG. 6j. It should be noted that waveform 660 has a positive-going transition delayed by one-half cycle of the reference subcarrier as compared with the positive-going transition of waveform 656. Consequently, early gate 560 is enabled by signal 656 one-half cycle of the subcarrier earlier than late gate 562. Depending upon which gate is enabled by the output of FF 540, either early signal 656 or late signal 660 will be coupled to OR gate 564 as illustrated by signal 662 of FIG. 6k to enable gate 566 and begin gating of the clock signal as illustrated by 664 of FIG. 6m.

The selection of the early or late gate is determined by the condition of the output of gate 50 during a positive-going transition of the output of MVB 544. Output signal 280 produced by gate 50 is repeated as FIG. 6n. Output signal 612 of MVB 544 is illustrated in FIG. 6o and the resulting output of FF 540 under one set of normal operation conditions is illustrated as 614 of FIG. 6p. The corresponding Q̄ output of FF 540 is illustrated as 616 of FIG. 6q.

Not mentioned so far in FIG. 5 are terminals 546 and 572, and inverters 547 and 548. Terminal 546 is coupled to the input of inverter 547, and the output of inverter 547 drives the reset input of FF 542 and the input of inverter 548. The output of inverter 548 is coupled to the reset input of FF 540. In normal operation, Moviola input 546 is set high, which holds FF 542 reset and allows normal operation of FF 540, as described. For Moviola operation, terminal 546 is held low, which disables FF 540 and enables FF 542. With FF 540 disabled, the parity pulse can no longer effect switching of the phase of the read clock to correct chroma errors. Instead, the information as to the phase of the subcarrier at write-in compared with that at read-out is coupled to the D input of FF 542 and stored there for one line. The Q output of FF 542 is coupled by a buffer amplifier 570 to an output terminal 572 for application to a chroma inverter of known type, as that described in U.S. Pat. No. 4,024,571 issued May 17, 1977 to Dischert, et al.

Chroma correction can therefore be accomplished by chroma inversion rather than by clock or subcarrier inversion. Thus, the arrangement of FIG. 5 accepts the information relative to the subcarrier phase at which the video information was written into memory, stores it for a length of time as may be required, and inverts the phase of the read clock (in effect inverting the chrominance of the video signal relative to reference burst during reading from memory).

Alternatively, the information as to the phase at write-in is used to invert the chroma by use of chroma inverter 574 without affecting the phase of the read clock. In either case, an inversion of the chroma information relative to the local subcarrier is accomplished at the time of reading from memory. In normal operation, the read clock phase inversion by delay gate 46 operates infrequently so that the half-cycle of subcarrier horizontal displacement of the video picture that this causes is not objectionable. However, in "STILL FRAME" or "MOVIOLA" operation of a tape recorder, the jump might occur every field. The use of chroma inverter 574 as explained above solves this problem by inverting the chrominance (color) components of the signal without affecting the luminance (form and detail) portion. The chroma inverter could be left in operation all the time, solving both the color phase problem and eliminating the luminance step or shift. This is not done because the present state of the art and economics limit the bandwidth of chroma inverters such that they introduce a noticeable loss of resolution or picture sharpness.

In FIG. 5, chroma inverter 574 follows DOC 510. Most dropout correctors introduce a video delay of one horizontal line. As mentioned, reclocking of the raw invert signal introduces a 1-line delay. Consequently, the invert signal applied to chroma inverter 574 is properly timed to correspond to the video entering the inverter.

Other embodiments of the invention will be obvious to those skilled in the art. For example, counters driven by a high-frequency clock may be used to provide the various delays which in the embodiments described are provided by multivibrators.

Other clock frequencies may be used. If three times subcarrier is used instead of four times as in the described embodiment, an EXCLUSIVE-OR gate shown as 54 in FIG. 5 is interposed between local clock generator 41 and gate 566, and one input of the gate is coupled to the Q output of FF 540. Note that in time base correctors which use a clock frequency of three times subcarrier, the clock goes through 1½ cycles in ½ cycle of subcarrier, so the clock steps $3 \times 180° = 180°$ when the clock release steps by one-half cycle of subcarrier. This inverts the chrominance. Gate 54 inverts the clock when the stepover or shift occurs. Gate 54 is not necessary for a clock frequency of four times subcarrier because the clock steps $4 \times 180° = 0°$ for each half-cycle of subcarrier change in the clock release.

Figure 7:
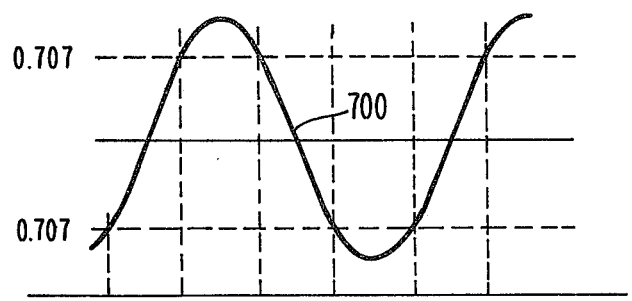
FIG. 7 is a voltage-time plot of a subcarrier signal illustrating alternative gating times.

The horizontal displacement can be made smaller by dividing the subcarrier into smaller portions, as by commencing writing into memory at for example the first achievement of a particular amplitude of the subcarrier 700, as illustrated in FIG. 7. Quadrature or 90° crossing detectors are used with waveform 700 of FIG. 7 instead of zero-crossing detectors 18 and 42 in the embodiment of FIG. 1. The quadrature detector in such an arrangement detects four crossings of waveform 700 of a level equal to 0.707 times the peak value of the waveform. Writing into memory is then on the first such crossing occurring after a fixed delay after the input timing signal. The quadrature detector detects the particular crossing and produces a control signal which is encoded into a 2-bit signal representing the particular one of the four zero-crossings at which writing started. The 2-bit signal is coupled through memory as described and is used to shift the phase of the read clock in 90° increments to correct phase. Division of the subcarrier into smaller portions requires clock frequencies higher than 4 times, but the displacement distortion can be made smaller in an analogous manner.

What is claimed is:

1. A television video delay arrangement, adapted to delaying color television signals from a source of television composite signals including synchronizing timing signals, chrominance information and burst signals, comprising:

input clock generator means coupled to the source of color television signals for generating input clock signals at a rate related to the burst signals;

memory means;

gating means for gating said input clock signals to said memory means beginning at the time of the first one of a predetermined plurality of phases of said burst following a predetermined time after each synchronizing timing signal for commencing writing into memory, which creates an ambiguity in the phase of said burst relative to the chrominance information which may result in color distortion;

burst phase sensing means coupled to said source and to said gating means for producing a phase indication signal indicative of the phase of said burst relative to said chrominance information at the time of said commencement of writing into memory; and reading means for reading said chrominance information out of said memory, said reading means comprising phase correction means coupled to said phase sensing means for correcting the phase of said chrominance information read out of said memory relative to a local subcarrier to match the phase of said chrominance information relative to said burst under the control of said phase indication signal for correcting said color distortion.

2. An arrangement according to claim 1 wherein said phase sensing means and said inversion means are coupled to said memory means for delaying said phase indication signal.

3. An arrangement according to claim 1 or 2 wherein said inversion means further comprises:
a source of local reference subcarrier signals;
a source of local clock signals coupled to said source of local reference subcarrier signals for producing local clock signals at a frequency related to said local reference subcarrier signals;
controllable phase inversion means coupled to said memory and to said source of local clock signals for coupling said local clock signals to said memory means for controlling the read-out, said inversion means having a controllable phase characteristic;
control means coupled to said memory and to said controllable phase inversion means for controlling the phase of said local clock signal applied to said memory means for correcting said color distortion.

4. An arrangement according to claim 1, wherein said phase sensing means comprises zero-crossing sensing means responsive to zero crossings of said burst, and wherein said predetermined plurality is two.

5. An arrangement according to claim 4, wherein said zero-crossing sensing means further comprises:
first and second gates responsive to said burst signal for producing first and second oppositely-poled square waves with transitions occurring at the time of said zero-crossings;
first and second flip-flops coupled to the outputs of said first and second gates, respectively, for producing early and late transition signals, respectively, indicative of the time of occurrence of said first one of said predetermined plurality of phases of said burst after a predetermined time after each synchronizing timing signal;
a third flip-flop coupled to said first and second flip-flops for responding to the earlier of said early and late transitions and for holding the information in the form of a preliminary phase indication signal; and
pulse generating means coupled to said third flip-flop for producing said phase indication signal from said preliminary phase indication signal.

6. A television digital video delay arrangement, adapted for delaying analog color television signals from a source of analog composite television signals including synchronizing timing signals, chrominance information and input chrominance reference subcarrier burst signals, the arrangement comprising:
input clock generating means coupled to the source of television signals for generating input clock signals at a rate established by the input video burst signals;
memory means;
input gating means coupled to said input clock generating means and to said memory means for applying said input clock signal to said memory means beginning at the time of the first one of a predetermined plurality of phases of said reference subcarrier for commencing writing of said chrominance information into said memory, which creates an ambiguity in the phase of said chrominance information in said memory relative to the phase of said input chrominance reference subcarrier signals which may result in color distortion;
phase sensing means coupled to said input gating means for producing a phase indication signal indicative of the phase of said input chrominance reference subcarrier at the time of said commencement of writing into memory;
a source of local reference subcarrier signals;
controllable local clock signal generating means coupled to said memory means and to said source of local reference subcarrier signals for generating local clock signals at a rate established by said local subcarrier signals for controlling reading from memory;
a source of local synchronization timing signals; and
control means coupled to said phase sensing means and to said controllable clock generating means and responsive to said phase indication signal for controlling the phase of said local reference subcarrier at the time at which said local clock signals are applied to said memory means after each local synchronization timing signal for correcting said color distortion.

7. An arrangement according to claim 6 further comprising second memory means coupled to said phase sensing means and to said controllable local clock signal generating means for delaying said phase indication signal.

8. An arrangement according to claim 6 or 7 wherein said predetermined plurality is two, and said controllable local clock signal generating means controls to phase in 180° steps.

9. An arrangement according to claim 8 wherein said input gating means comprises:
first delay means the input of which is coupled to said source of television signals for responding to said timing synchronization signal and for producing a first delay signal at a predetermined time after said timing synchronization signal;
zero-crossing indication gate means coupled to said source of television signals for producing regularly recurring zero-crossing signals during zero crossings of said input chrominance reference subcarrier signals;
latch means coupled to said first delay means and to said zero-crossing indicator gate means for producing early and late zero-crossing signals in response to positive transitions of said regularly recurring zero crossing signals;

first gating means coupled to said latch means for producing a write gate control signal beginning with the occurrence of either one of said early and late zero-crossing signals; and second gating means coupled to said first gating means to said input clock generating means and to said memory means for applying said input clock signal to said memory means beginning at the time of the first one of a predetermined plurality of phases of said reference subcarrier occurring a predetermined interval after each synchronizing timing signal.

10. An arrangement according to claim 6 wherein said controllable local clock signal generating means further comprises:

a frequency multiplier coupled to said source of local reference subcarrier signals for generating said local clock signals;

delay gating means coupled to said frequency multiplier and to said memory means for controllably coupling said local clock signals to said memory means for controlling reading from memory; and delay generator means coupled to said control means and to said delay gating means for controlling the time of said coupling of said local clock signals to said memory means in predetermined time increments determined by said plurality of phases.

11. A time-base corrector adapted for use with a source of television signals including chrominance information signals, timing synchronization signals and reference burst signals following each of said timing synchronization signals by intervals which may vary, comprising:

subcarrier regenerating means coupled to said source of television signals for regenerating an input signal subcarrier from said burst signals;

write clock generating means coupled to said regenerating means for generating a write clock signal at a rate established by said input signal subcarrier reference;

zero-crossing detector means coupled to said subcarrier regenerating means and to said source of television signals for detecting zero crossings of said input signal subcarrier reference after a fixed interval following each of said timing synchronization signals and generating a zero-crossing indication signal;

gating means coupled to said write clock generating means and to said zero crossing detector means for gating said write clock in response to said zero-crossing indication signal, whereby small changes in the time of occurrence of said burst from line-to-line may cause abrupt line-to-line changes in the time at which gating of said write clock is initiated;

memory means coupled to said source of television signals and to said gating means for storing signals representative of said chrominance information in a coherent manner in predetermined locations in said mamory, said predetermined locations being sequentially addressed by said gated write clock whereby said abrupt changes affect the time at which storage of said television signals in said memory begins;

read clock means coupled to said memory means for reading out said television signals, whereby the effect of said abrupt changes is to cause horizontal displacement of said television signals as displayed on a raster;

wherein the improvement lies in that said zero-crossing detector means responds to zero crossings of either polarity for reducing the magnitude of said horizontal displacement, whereby an ambiguity is introduced in the phase of said chrominance information at said time at which said write clock signal is gated, which may result in color distortion of said chrominance information read out of said memory means; and said improvement further comprises:

phase determining means coupled to said zero-crossing detector means for determining the phase of said regenerated subcarrier at said time at which said write clock signal is gated to form a phase indication signal; and inverting means coupled to said phase determining means, and to said memory means for controlling the phase of said chrominance information read out of said memory means in response to said phase indication signal for reducing said color distortion.

12. A corrector according to claim 11, wherein said phase indication signal is coupled to said memory means for delaying said phase indication signal, and wherein said inverting means is coupled to said phase determining means by way of said memory means for receiving said phase indication signal delayed by said memory.

13. A corrector according to claim 12 further comprising a source of local clock signals coupled to said memory means by way of said inverting means, and wherein said inverting means inverts the phase of said local clock signals applied to said memory signals under the control of said phase indication signal for correcting said color distortion.

14. A corrector according to claim 13 further comprising a source of local subcarrier signals coupled to said source of local clock signals; a source of local timing synchronization signals; first delay means coupled to said source of local timing synchronization signals for producing a zero-crossing detection enabling signal at a predetermined fixed time after said timing synchronization signal; first and second signal processing means coupled to said first delay means and to said source of local subcarrier signals for producing local odd-even output signals representing the phase of the first zero crossing of said local subcarrier signals following said enabling signal; means for comparing said local odd-even signal with said delayed phase indication signal for generating a local clock phase inversion control signal; and means for coupling said inversion signal to said phase inverting means.

15. A corrector according to claim 12 further comprising a source of local reference subcarrier signals, and wherein said inverting means comprising chrominance signal inverting means responsive to said phase indication signals for inverting the phase of said chrominance information signal relative to said local reference subcarrier signals for correcting said color distortion.

16. A television video delay arrangement, adapted to delaying color television signals from a source of television composite signals including synchronizing timing signals, chrominance information and burst signals, comprising:

input clock generator means coupled to the source of color television signals for generating input clock signals at a rate related to the burst signals;

memory means;

enabling means for enabling said memory means beginning at the time of the first one of a predetermined plurality of phases of said burst following a predetermined time after each synchronizing timing signal for commencing writing into memory, which allows an ambiguity in the phase of said burst relative to the chrominance information which may result in color distortion;

burst phase sensing means coupled to said source and to said enabling means for producing a phase indication signal indicative of the phase of said burst relative to said chrominance information at the time of said commencement of writing into memory; and reading means for reading said chrominance information out of said memory, said reading means comprising phase correction means coupled to said phase sensing means for correcting the phase of said chrominance information read out of said memory relative to a local subcarrier for correcting said color distortion.

17. An arrangement according to claim 16 wherein said phase sensing means and said inversion means are coupled to said memory means for delaying said phase indication signal.

18. An arrangement according to claim 17 wherein said inversion means further comprises:
- a source of local reference subcarrier signals;
- a source of local clock signals coupled to said source of local reference subcarrier signals for producing local clock signals at a frequency related to said local reference subcarrier signals;
- controllable phase inversion means coupled to said memory and to said source of local clock signals for coupling said local clock signals to said memory means for controlling the read-out, said inversion means having a controllable phase characteristic;
- control means coupled to said memory and to said controllable phase inversion means for controlling the phase of said local clock signal applied to said memory means for correcting said color distortion.

19. An arrangement according to claim 16 wherein said phase sensing means comprises zero-crossing sensing means responsive to zero crossings of said burst, and wherein said predetermined plurality is two.

20. An arrangement according to claim 19, wherein said zero-crossing sensing means further comprises:
- first and second gates responsive to said burst signal for producing first and second oppositely-poled square waves with transitions occurring at the time of said zero-crossings;
- first and second flip-flops coupled to the outputs of said first and second gates, respectively, for producing early and late transition signals, respectively, indicative of the time of occurrence of said first one of said predetermined plurality of phases of said burst after a predetermined time after each synchronizing timing signal;
- a third flip-flop coupled to said first and second flip-flops for responding to the earlier of said early and late transitions and for holding the information in the form of a preliminary phase indication signal; and
- pulse generating means coupled to said third flip-flop for producing said phase indication signal from said preliminary phase indication signal.

21. A television digital video delay arrangement, adapted for delaying analog color television signals from a source of analog composite television signals including synchronizing timing signals, chromiance information and input chrominance reference subcarrier burst signals, the arrangement comprising:
- subcarrier regenerating means coupled to the source of television signals for generating regenerated subcarrier signals at a rate established by the input video burst signals;
- memory means;
- memory write control means coupled to said subcarrier regenerating means and to said memory means for enabling said memory means beginning at the time of the first one of a predetermined plurality of phases of said reference subcarrier for commencing writing of said chrominance information into said memory, which creates an ambiguity in the phase of said chrominance information in said memory relative to the phase of said input chrominance reference subcarrier burst signals which may result in color distortion;
- phase sensing means coupled to said memory write control means for producing a phase indication signal indicative of the phase of said input chrominance reference subcarrier at the time of said commencement of writing into memory;
- a source of local reference subcarrier signals; and
- memory read control means coupled to said phase sensing means and to said memory means and responsive to said phase indication signal for controlling the phase of said local reference subcarrier at which said memory means is read for correcting said color distortion.

* * * * *